United States Patent
Lee et al.

(10) Patent No.: US 7,977,595 B2
(45) Date of Patent: Jul. 12, 2011

(54) AUTOMATIC DISCHARGING APPARATUS FOR CLOSING SPRING IN AIR CIRCUIT BREAKER AND AIR CIRCUIT BREAKER HAVING THE SAME

(75) Inventors: Sang-Chul Lee, Chungcheongbuk-Do (KR); Ki-Hwan Kim, Chungcheongbuk-Do (KR); Hong-Ik Yang, Chungcheongbuk-Do (KR); Kil-Young Ahn, Daejeon (KR)

(73) Assignee: LS Industrial Systems Co., Ltd., Seoul (KR)

( * ) Notice: Subject to any disclaimer, the term of this patent is extended or adjusted under 35 U.S.C. 154(b) by 645 days.

(21) Appl. No.: 12/038,858

(22) Filed: Feb. 28, 2008

(65) Prior Publication Data

US 2008/0217151 A1   Sep. 11, 2008

(30) Foreign Application Priority Data

Mar. 8, 2007   (KR) .................. 10-2007-0023213

(51) Int. Cl.
*H01H 5/00* (2006.01)
(52) U.S. Cl. .................. 200/400; 200/50.21
(58) Field of Classification Search .............. 200/400
See application file for complete search history.

(56) References Cited

U.S. PATENT DOCUMENTS

| | | | |
|---|---|---|---|
| 5,938,008 A * | 8/1999 | Wehrli et al. | 200/400 |
| 6,160,234 A * | 12/2000 | Wehrli et al. | 200/400 |
| 6,177,641 B1 | 1/2001 | Morel et al. | |
| 6,184,483 B1 * | 2/2001 | Coudert et al. | 200/50.21 |
| 7,397,008 B2 * | 7/2008 | Ahn et al. | 200/400 |
| 2006/0086693 A1 | 4/2006 | Yeon | |
| 2006/0119455 A1 | 6/2006 | Park | |
| 2006/0131145 A1 | 6/2006 | Suh | |
| 2007/0075047 A1 | 4/2007 | Oh | |
| 2007/0075808 A1 | 4/2007 | Ahn | |
| 2008/0088396 A1 | 4/2008 | Ahn et al. | |

FOREIGN PATENT DOCUMENTS

| | | |
|---|---|---|
| EP | 0048042 | 3/1982 |
| EP | 1914774 | 4/2008 |
| JP | 61-199406 | 9/1986 |
| JP | 11-329169 | 11/1999 |
| JP | 2000-209719 | 7/2000 |
| JP | 2005-85515 | 3/2005 |

OTHER PUBLICATIONS

Japan Office action, mail date is Mar. 15, 2011.

* cited by examiner

*Primary Examiner* — Renee Luebke
*Assistant Examiner* — Lheiren Mae Caroc
(74) *Attorney, Agent, or Firm* — Greenblum & Bernstein P.L.C.

(57) ABSTRACT

Provided are an air circuit breaker capable of allowing a closing spring to be automatically discharged at a pulled-out position in a pull-out type air circuit breaker and an automatic discharging apparatus for the closing spring in the air circuit breaker, the automatic discharging apparatus for the closing spring comprising a cam shaft rotation preventing unit installed on a cam shaft allowing the closing spring to be charged or discharged and configured to restrict the rotation of the cam shaft by an elastic restoring force of the closing spring, and a unit for releasing the cam shaft rotation preventing unit connected to the cam shaft rotation preventing unit and configured to allow the cam shaft to be rotated by the elastic restoring force of the closing spring according to positions where a main body of the air circuit breaker is pulled out of a cradle.

8 Claims, 11 Drawing Sheets

AUTOMATIC DISCHARGING APPARATUS FOR CLOSING SPRING IN AIR CIRCUIT BREAKER AND AIR CIRCUIT BREAKER HAVING THE SAME

BACKGROUND OF THE INVENTION

1. Field of the Invention

The present invention relates to a pull-out type air circuit breaker with a main body which can be pushed in or pulled out on a cradle, and particularly, to an automatic discharging apparatus for a closing spring in an air circuit breaker in which the closing spring is allowed to be automatically discharged while pulling out the main body of the air circuit breaker, and also the closing spring is prevented from being charged due to operating of a closing spring charging handle in a state that the main body has completely been pulled out.

2. Background of the Invention

In general, an air circuit breaker is an electronic device which selectively opens or closes an electric circuit between a power source side and a load side in the air. The air circuit breaker may be classified into a fixed type air circuit breaker fixedly connected to circuit connection terminals of the respective power source side and load side, and a pull-out type air circuit breaker having its main body allowed to be pushed in or pulled out of a cradle with circuit connection terminals of respective power source side and load side. In the recent time, due to the difficulty of maintenance of the fixed type air circuit breaker, the pull-out type air circuit breaker are broadly used.

As defined in standards of electric devices, such pull-out type air circuit breaker should employ a pull-out interlocking device for safely protecting an operator or a repair inspector from risks which may be caused due to an accidental discharging of an energy storage device (e.g., a spring charging device).

Therefore, the present invention was invented as such pull-out interlocking device.

Now, an operation of pushing in and pulling out a general pull-out type air circuit breaker and an electrical operation accordingly performed will be briefly described with reference to FIGS. 1A to 1D.

FIG. 1A is a state view showing a connection position of a general pull-out type air circuit breaker. In the state as shown in FIG. 1A, a main circuit terminal C2 of a cradle and main circuit terminals 20b of a main body 20 of the air circuit breaker are electrically connected to each other such that a power source side and a load side of the main circuit can be in an electrically connected state via the air circuit breaker.

Referring to FIG. 1A, reference numeral 20a denotes the control signal receiving terminal of the main body 20 to receive a switching control signal of the air circuit breaker, C1 denotes the cradle control signal terminal to transfer the switching control signal received from the exterior to the control signal receiving terminal 20a, numeral 1 denotes a switching mechanism of the air circuit breaker, and H1 designates a closing spring charging handle. The state in FIG. 1A corresponds to the main circuit and the control signal receiving terminal 20a being connected to each other, namely, a so-called connected position.

FIG. 1B is a state view showing that the main circuit is broken by the main circuit terminal 20b being disconnected and the control circuit terminal 20a being connected in the general pull-out type air circuit breaker. This state corresponds to a state at the beginning of pulling out the pull-out air circuit breaker. In this state, the main circuit terminal C2 of the cradle is disconnected from the main circuit terminals 20b of the main body 20 of the air circuit breaker such that the power source side and the load side of the main circuit are electrically broken. Also, the state shown in FIG. 1B corresponds to a test position at which a switching operation can be tested by sending only the switching control signal to the air circuit breaker under the main circuit being broken.

FIG. 1C is a state view showing that nor the main circuit terminal 20b and the control circuit terminal 20a are connected in the general pull-out type air circuit breaker. Here, the state is referred to as a disconnected position that the pull-out type air circuit breaker is disconnected from both the main circuit and the control circuit.

FIG. 1D is a state view showing that the main body 20 of an air circuit breaker is pulled out of the cradle C along pull-out rails in the general pull-out type air circuit breaker. Here, this state is referred to as a pulled-out position at which nor the main circuit terminal 20b and the control circuit terminal 20a are disconnected and the air circuit breaker is completely pulled out of the cradle C for maintenance.

FIGS. 2 to 5 are views showing a relation between a cam shaft and a closing spring in charging and discharging in a related art air circuit breaker with an automatic discharging device for the closing spring. FIG. 2 is a cross-sectional view showing a switching mechanism in a state that the air circuit breaker is broken. FIG. 3 is a cross-sectional view showing the switching mechanism of the air circuit breaker according to the related art, which shows a charged state of the closing spring. FIG. 4 is a cross-sectional view showing the switching mechanism of the air circuit breaker according to the related art, which shows a state of the switching mechanism being closed due to discharging of the closing spring. FIG. 5 is a perspective view showing the switching mechanism of the air circuit breaker according to the related art.

Configuration and operation of the switching mechanism of the related art air circuit breaker will be described with reference to FIGS. 2 to 5.

First, the configuration of the switching mechanism in the related art air circuit breaker will be described with reference to FIGS. 2 to 5.

As shown in FIG. 2, the switching mechanism of the air circuit breaker includes a stationary contactor 12, and a movable contactor 11 connected to the stationary contactor 12 to be movable to a closing position at which a conduction circuit is closed, and disconnected from the stationary contactor 12 to be movable to a breaking (trip) position at which the conduction circuit is opened.

Still referring to FIG. 2, the movable contactor 11 is connected to a main shaft lever 10-1 to be in contact with the stationary contactor 12 or separated from the stationary contactor 12 according to a rotational direction of the main shaft lever 10-1.

The main shaft lever 10-1 is typically used when the air circuit breaker opens or closes each of conducting paths for 3 phases. Thus, three of the main shaft levers 10-1 are required in total (i.e., one for each phase). Each main shaft lever 10-1 drives the movable contactor 11 for the corresponding phase.

In order for the three main shaft levers 10-1 to be simultaneously driven, each of the main shaft levers 10-1 is coaxially connected to one common main shaft 10.

Therefore, the main shaft 10 penetrates both side plates 1 supporting the switching mechanism 1 so as to extend to be connected to the main shaft lever 10-1 of a different phase.

Among the three main shaft levers 10-1, the central main shaft lever 10-1 connected to the switching mechanism 1 has one end portion connected to the main shaft 10 and another end portion connected to a first link 6.

Like gears having different pivots and engaged with each other, one end portion of the first link 6 is connected to the main shaft lever 10-1, such that the main shaft lever 10-1 and the first link 6 are rotated in mutually opposite directions. The first link 6 provides a driving force to the central main shaft lever 10-1 among the three main shaft levers, to allow the central main shaft lever 10-1 to drive the movable contactor 11 to an opening or closing position.

A second link 4 is connected to another end portion of the first link 6, and the first and second links 6 and 4 are rotated in the same direction.

A third link 3 is rotatably disposed, which has one end portion connected to another end portion of the second link 4 by a driving connection pin P, so as to transfer the driving force to the second link 4.

A closing spring unit includes a closing spring 13 which provides a driving force to drive the movable contactor 11 to the closing position, and a closing spring seat (no reference numeral given). The closing spring 13 charges elastic energy, and then discharges the charged elastic energy to provide a driving force to allow the movable contactor 11 to be moved to the closing position.

In order to avoid the release of the closing spring 13 and support the rotation of the closing spring seat, a closing spring support bracket 18 is employed which supports another end of the closing spring 13 opposite to the one end of the closing spring 13 from which the driving force of the closing spring is provided.

The switching mechanism 1 of the air circuit breaker includes a charging cam 2 which provides a driving force for charging an elastic force of the closing spring unit. The charging cam 2 is rotatable together with a cam shaft 2a. The charging cam 2 is provided with a cam roller 2b represented by a dotted line in FIG. 5 on one side of a rear surface thereof.

The third link 3 is coaxially connected to the cam shaft 2a of the charging cam 2 to be rotatable together.

Referring to FIG. 5, a driving lever 16 includes a driving lever pin 16b which is in contact with the second link 4 to allow the second link 4 to be driven. The driving lever 16 is implemented as a pair (i.e., 16 and 16) spaced apart from each other by the driving lever pin 16b, and the second and third links 4 and 3 are interposed between the pair of levers 16. The driving levers 16 are connected to the closing spring unit, such that it can supply a driving force for charging elastic energy to the closing spring unit or can be rotatable upon receiving the discharged elastic energy from the closing spring unit.

As shown in FIG. 2, an opening spring 14 is a spring having one end supported by the main shaft lever 10-1 and another end supported by a spring support pin (no reference numeral given) fixed onto the side plate 1. The opening spring 14 is tensioned by a clockwise rotation of the main shaft lever 10-1 at the time of a closing operation so as to charge elastic energy. The opening spring 14 then discharges the charged elastic energy at the time of breaking a circuit to provide a driving force such that the main shaft lever 10-1 can be rotated in a counterclockwise direction.

As shown in FIG. 5, a pair of third link elastic bias springs 15 are provided. Each third link elastic bias spring 15 has one end supported by a driving lever pin 16b of the driving levers 16 and another end supported by a driving connection pin P which allows the second and third links 4 and 3 to be driven.

The driving connection pin P penetrates the second and third links 4 and 3 to allow the second and third links 4 and 3 to be driven. The driving connection pin P extends to be protruded such that the pair of third link elastic bias springs 15 can be supported at its both ends.

In order to avoid interference by the protruded driving connection pin P, the pair of driving levers 16 and 16 are spaced apart from each other by a predetermined distance.

A closing latch 5 extends in a vertical direction so as to have one surface located on a moving locus of the can roller 2b disposed at one surface of the charging cam 2. Accordingly, the closing latch 5 can latch the rotation of the charging cam 2. An upper end portion of the closing latch 5 is located on a rotating path of an on-shaft 8. Thus, the closing latch 5 may be latched or released by the on-shaft 8.

The on-shaft 8 is connected to an on-button (not shown) to be manually rotated or automatically rotated by being connected to an electrical driving controller and an actuator.

A recess 3a is formed at an upper portion of the third link 3. An opening latch roller 7a is disposed which is movable to a position at which it can enter the recess 3a of the third link 3 or separated therefrom. Also, an opening latch 7 rotatable centering around a pivot 7b thereof is disposed above the third link 3. One end portion of the opening latch 7 is connected to an opening latching spring 7c by a pin. Accordingly, the opening latch 7 receives an elastic bias force applied from the opening latch spring 7c such that is can be allowed to be rotated counterclockwise in FIGS. 2 to 4.

An off-lever 9 is disposed to be in contact with another end of the opening latch 7 in a length direction. The off-lever 9 latches or releases the rotation of the opening latch 7.

Operations of the switching mechanism of the related art air circuit breaker having such configuration are divided into a charging (elastic force charging) operation, a closing operation and an opening (breaking) operation, which will now be described.

First, the charging operation of the closing spring is described with reference to FIG. 3.

The cam shaft 2a of the charging cam 2 is rotated by the closing spring charging handle (not shown) or a driving motor (not shown) in a counterclockwise direction based on the drawing.

Accordingly, as a radius of curvature at the outer circumferential surface of the charging cam 2 is reduced, the driving lever roller 16a of the driving lever 16 being in contact with an outer circumferential surface of the charging cam 2 is compressed. The driving lever roller 16a then presses the spring seat of the closing spring unit which is contacted to be pressed by the driving lever roller 16a, thereby compressing the closing spring 13.

Here, as the charging cam 2 is rotated, the driving lever roller 16a rolls along the outer circumferential surface of the cam 2. The charging cam 2 is rotated until the cam roller 2b disposed at one surface thereof is in contact with the closing latch 5.

With respect to the counterclockwise rotation of the charging cam 2, the third link 3, the second link 4 and the driving lever 16 interwork together to thusly be rotated in the counterclockwise direction.

Here, the rotation of the main shaft 10 is latched by the opening latch 7. Accordingly, the movable contactor 11 is kept separated from the stationary contactor 12 as shown in FIG. 3.

As the third link 3 is rotated in the counterclockwise direction, the latch roller 7a of the opening latch 7 is received into the recess 3a of the third link 3 so as to latch the counterclockwise rotation of the third link 3.

The cam roller 2b disposed at one surface of the charging cam 2 is in contact with the closing latch 5, thereby pushing the closing latch 5. The closing latch 5 is then rotated in the clockwise direction centering around its pivot. The clockwise rotation of the closing latch 5 is restrained by the on-shaft 8, resulting in completing the charging operation of the closing spring 13.

On the other hand, the closing operation of the switching mechanism of the related art air circuit breaker will now be described with reference to FIG. 4.

When the on-shaft 8 is manually rotated or automatically rotated by being connected to an electrical driving controller and an actuator via the on-button (not shown), the closing latch 5 is released from the On-shaft 8 to be rotated in the clockwise direction.

As the closing latch 5 is released, the cam roller 2b is also released from the closing latch 5.

Accordingly, the driving lever roller 16a, which has restrained discharging of the closing spring 13 while being in contact with the outer circumferential surface of the charging cam 2, diverges from the outer circumferential surface of the charging cam 2.

As the closing spring 13 is discharged, the driving lever 16 is pressed by the spring seat of the closing spring 13 to be rotated in the counterclockwise direction. Accordingly, the driving lever pin 16b pushes the second link 4 to rotate it in the counterclockwise direction on the drawing. The counterclockwise rotation of the second link 4 rotates the third link 3 in the counterclockwise direction. Therefore, the first link 6 is pressed to be pushed up by the second link 4, so as to be rotated in the counterclockwise direction.

The main shaft lever 10-1 and the first link 6 are connected to each other for interlocking. Accordingly, according to the counterclockwise rotation of the first link 6, the main shaft lever 10-1 is rotated in the clockwise direction by interworking with the first link 6, and simultaneously the main shaft 10 is rotated in the clockwise direction. Therefore, the movable contactor 11 interworking with the main shaft lever 10-1 is rotated in the counterclockwise direction on the drawing to be in contact with the stationary contactor 12, thereby closing the conduction circuit.

Here, the breaking spring 14 is in a tensioned state, namely, a state of charging (i.e., accumulating, storing) elastic energy.

Now, the opening operation of the switching mechanism in the related art air circuit breaker will be described with reference to FIG. 2.

When the off-shaft 9 is manually rotated clockwise or automatically rotated clockwise by being connected to an electrical driving controller and an actuator via the off-button (not shown), the opening latch 7 is released from the off-shaft 9 and rotated in the clockwise direction by the elastic force of the opening latch spring 7c. Also, the opening latch 7 is released from the recess 3a of the third link 3.

As the third link 3 is released from the opening latch 7, the interworked second and first links 4 and 6 are also released. Also, in a state that the opening spring 14 is tensioned while the closing operation, a support end portion of its main shaft lever 10-1 is returned to the side of the spring support pin of the side plate 1, and accordingly, the breaking spring 14 discharges the charged elastic energy, thereby rotating the main shaft lever 10-1 in the counterclockwise direction. Accordingly, the movable contactor 11 is rotated in the clockwise direction to be separated from the stationary contactor 12. Therefore, the conduction circuit is opened.

Such configured air circuit breaker may be pulled out in the state of the closing spring being charged without any means for discharging the elastic energy of the closing spring, when the closing spring is charged while the air circuit breaker main body is pulled out of the cradle.

When the closing spring is moved to the pulled-out position from the charged state, if the on-button is pressed by a user's mistake, the closing spring is discharged such that the air circuit breaker main body performs the closing operation. Here, the user may be surprised to hear sound occurred during the closing operation or any collateral accident may be caused.

Also, under the state that the main body of the air circuit breaker is pulled out of the cradle, the user may charge the closing spring by using the closing spring charging handle, which may resulting in an unstable state of the main body of the air circuit breaker due to the charged elastic energy.

SUMMARY OF THE INVENTION

Therefore, an object of the present invention is to provide an automatic discharging apparatus for a closing spring in an air circuit breaker capable of automatically discharging elastic energy of the closing spring which has been charged upon pulling out a main body of the air circuit breaker, and also avoiding the charging of the closing spring by using a closing spring charging handle which a user operates by mistake in the pulled out state of the main body.

To achieve these and other advantages and in accordance with the purpose of the present invention, as embodied and broadly described herein, there is provided an automatic discharging apparatus for a closing spring in an air circuit breaker, which includes a main body, a cradle to support the main body to be connectable and pulled out, and a switching mechanism including a closing spring to apply elastic energy for closing the air circuit breaker, a cam to allow the closing spring to charge the elastic energy or discharge the charged elastic energy, and a cam shaft to rotatably support the cam, the apparatus comprising: a cam shaft rotation preventing unit and configured to prevent the rotation of the cam shaft by an elastic restoring force of the closing spring; and a unit for releasing the cam shaft rotation preventing unit connected to the cam shaft rotation preventing unit, and operated according to a position at which the air circuit breaker main body is pulled out of the cradle to release the cam shaft rotation preventing unit such that the cam shaft can be rotated by the elastic restoring force of the closing spring.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

wherein FIG. 1A is a state view showing a state of a connected position of the general air circuit breaker, FIG. 1B is a state view showing that a main circuit terminal is disconnected and a control circuit terminal is connected such that the main circuit is broken, in the general pull-out type air circuit breaker, FIG. 1C is a state view showing that nor the main circuit terminal and the control circuit terminal are connected in the general pull-out type air circuit breaker, and FIG. 1D is a state view showing a state that the main body of the air circuit breaker is pulled out of the cradle along pull-out rails in the general pull-out type air circuit breaker;

wherein FIG. 2 is a cross-sectional view of a switching mechanism in which the related art air circuit breaker is broken, FIG. 3 is a cross-sectional view of the switching mechanism of the related air circuit breaker, which shows a state of a closing spring being charged, FIG. 4 is a cross-sectional view of the switching mechanism of the related art air circuit breaker, which shows that the closing spring is discharged such that the switching mechanism is driven to a closing position, and FIG. 5 is a perspective view showing the switching mechanism in the related art air circuit breaker;

DETAILED DESCRIPTION OF THE INVENTION

Description will now be given in detail of the present invention, with reference to the accompanying drawings.

Figure 6:
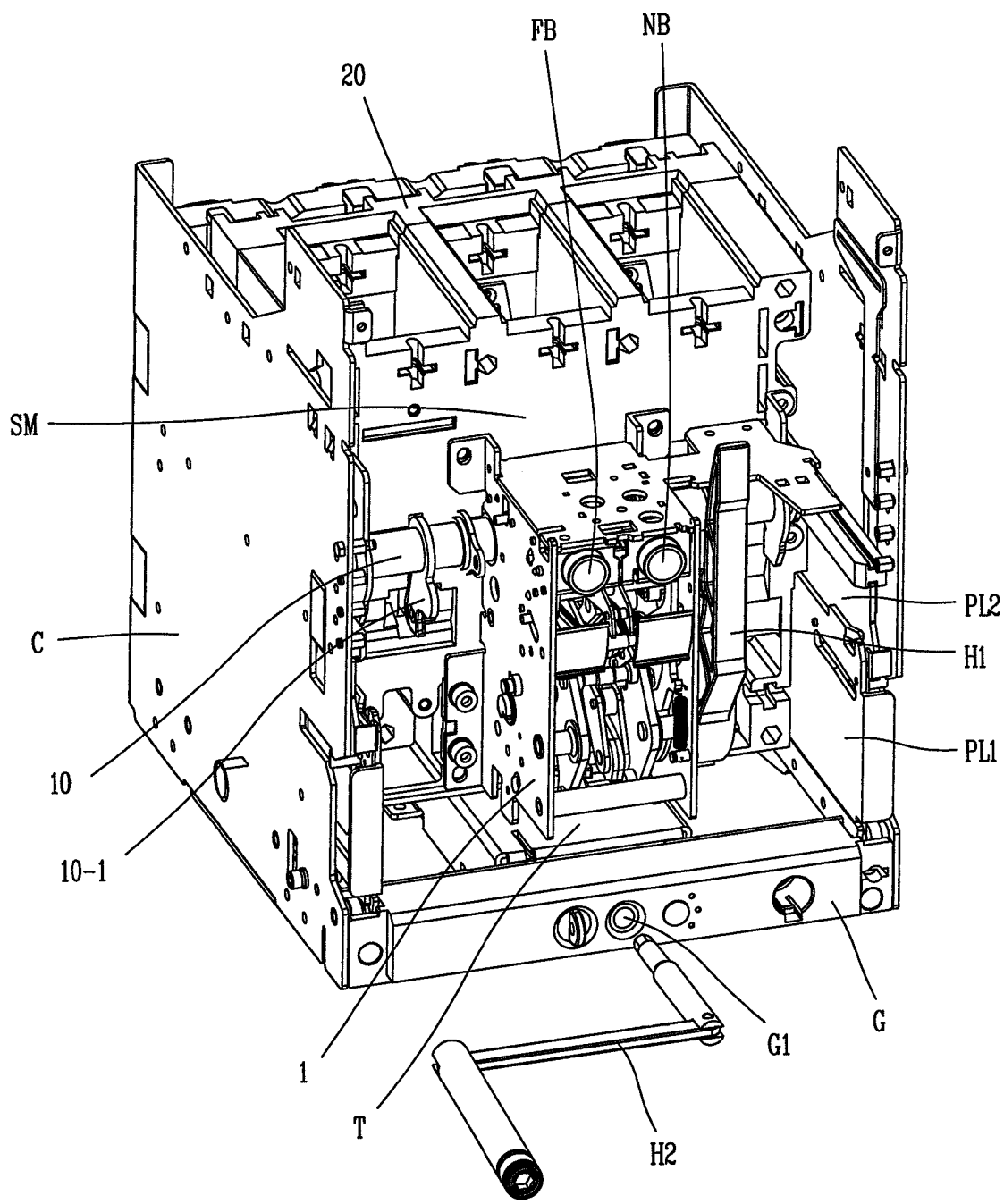
FIG. 6 is a perspective view showing an overall configuration of an air circuit breaker according to the present invention.

First, FIG. 6 is a perspective view showing an overall configuration of an air circuit breaker according to the present invention, which will be described as follows.

As shown in FIG. 6, the air circuit breaker according to the present invention may comprise a main body 20, a cradle C, a switching mechanism SM, a side plate 1 of the switching mechanism SM, an on-button NB, an off-button FB, a main shaft 10, a main shaft lever 10a, a closing spring charging handle H1, a first pull-out rail PL1, a second pull-out rail PL2, a transfer device, an upper cover T of the transfer device, a girder G, a transfer device driving handle H2, and a transfer device driving handle connection hole G1.

The cradle C supports the main body 20 to be pulled out.

The switching mechanism SM and the side plate 1 of the switching mechanism SM are included in the main body 20.

The on-button NB and the off-button FB are also included in the switching mechanism SM.

The main shaft 10 is operated by the switching mechanism SM and configured to simultaneously open/close contactors for three phases.

The main shaft lever 10a is connected to the main shaft 10 to drive a movable contactor 11 of the switching mechanism SM.

The charging handle H1 is configured to manually charge a closing spring in the switching mechanism SM.

The first and second pull-out rails PL1 and PL2 are disposed to guide the main body 20 to the second step upon pulling the main body 20 out of the cradle C.

The transfer device and the upper cover T of the transfer device support a driving force for pulling out the main body 20.

The girder G includes an operating portion for driving the transfer device, and is interposed between both side plates of the cradle C at a front surface side of the air circuit breaker.

Also, the transfer device driving handle H2 and the transfer device driving handle connection hole G1 are provided.

In order to manually drive the transfer device, a polygonal portion formed in tetragonal to octagonal shapes, for example, is formed at an end portion of the transfer device driving handle H2. Correspondingly, the transfer device handle connection hole G1 may have a driving shaft (not shown) of the driving device therein, which has one end portion formed to have a polygonal inner circumferential surface such that the end portion of the transfer device driving handle H2 is inserted therein.

In the meantime, the cradle C, the upper cover T of the transfer device, the two-stepped first and second pull-out rails PL1 and PL2 and the girder G have shapes and arrangements which are described with reference to FIG. 7. First and second pulled-out positions S1 and S2, in FIG. 7, respectively indicate a position immediately after being diverged from a disconnected position upon pulling out the main body 20 and a position at which a lower end movable member of the automatic discharging apparatus for the closing spring in the air circuit breaker is located in the state of the main body 20 being further pulled out.

Now, a detailed configuration of a unit for releasing the cam shaft rotation preventing unit of the automatic discharging apparatus for the closing spring in the air circuit breaker will be described with reference to FIG. 8.

Figure 8:
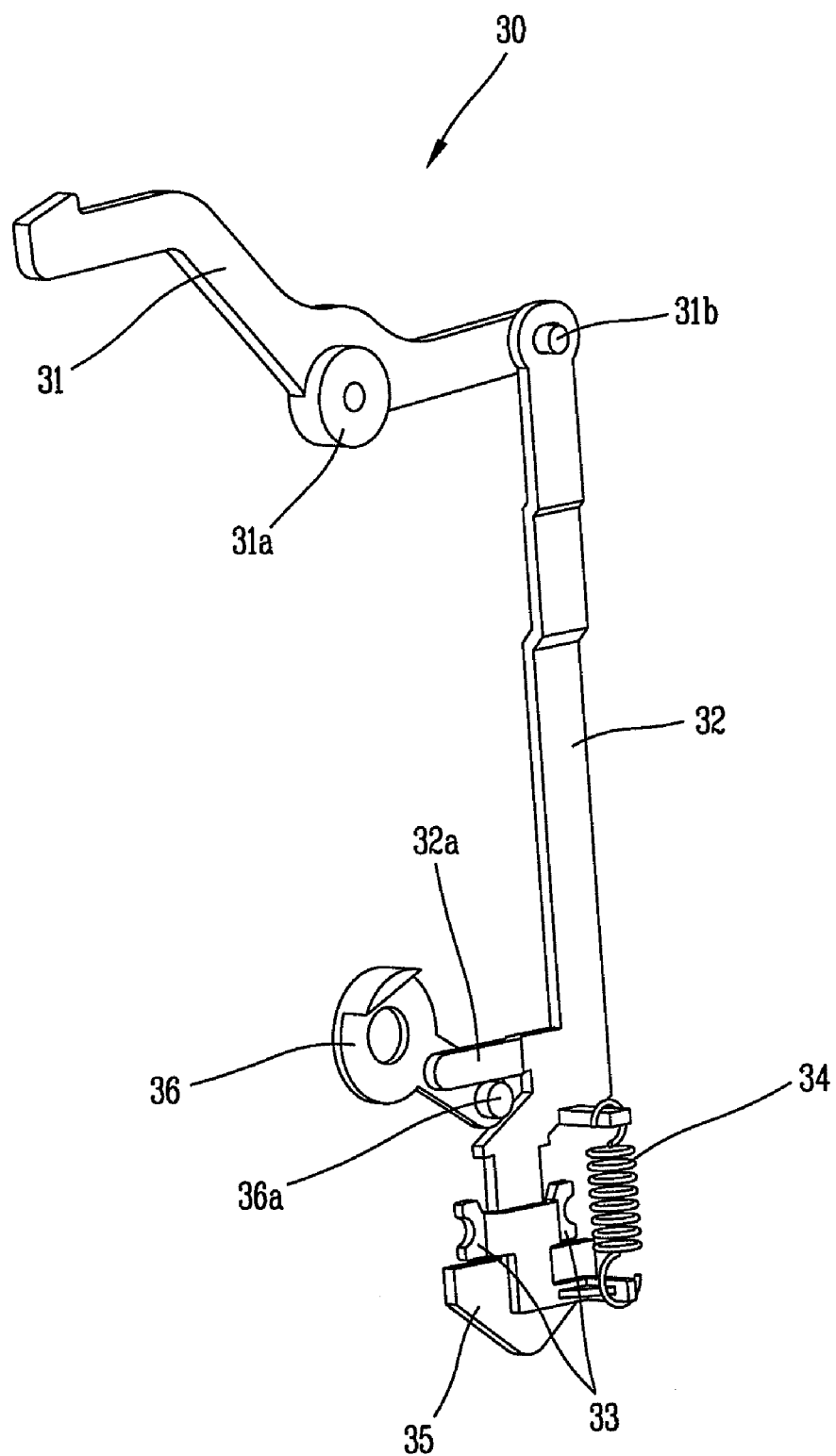
FIG. 8 is a perspective view showing a detailed configuration of a unit for releasing a cam shaft rotation preventing unit in an automatic discharging apparatus for a closing spring in the air circuit breaker according to the present invention.

As shown in FIG. 8, the unit 30 for releasing the cam shaft rotation preventing unit may include a lever 36, a link mechanism and a spring 34.

Figure 9:
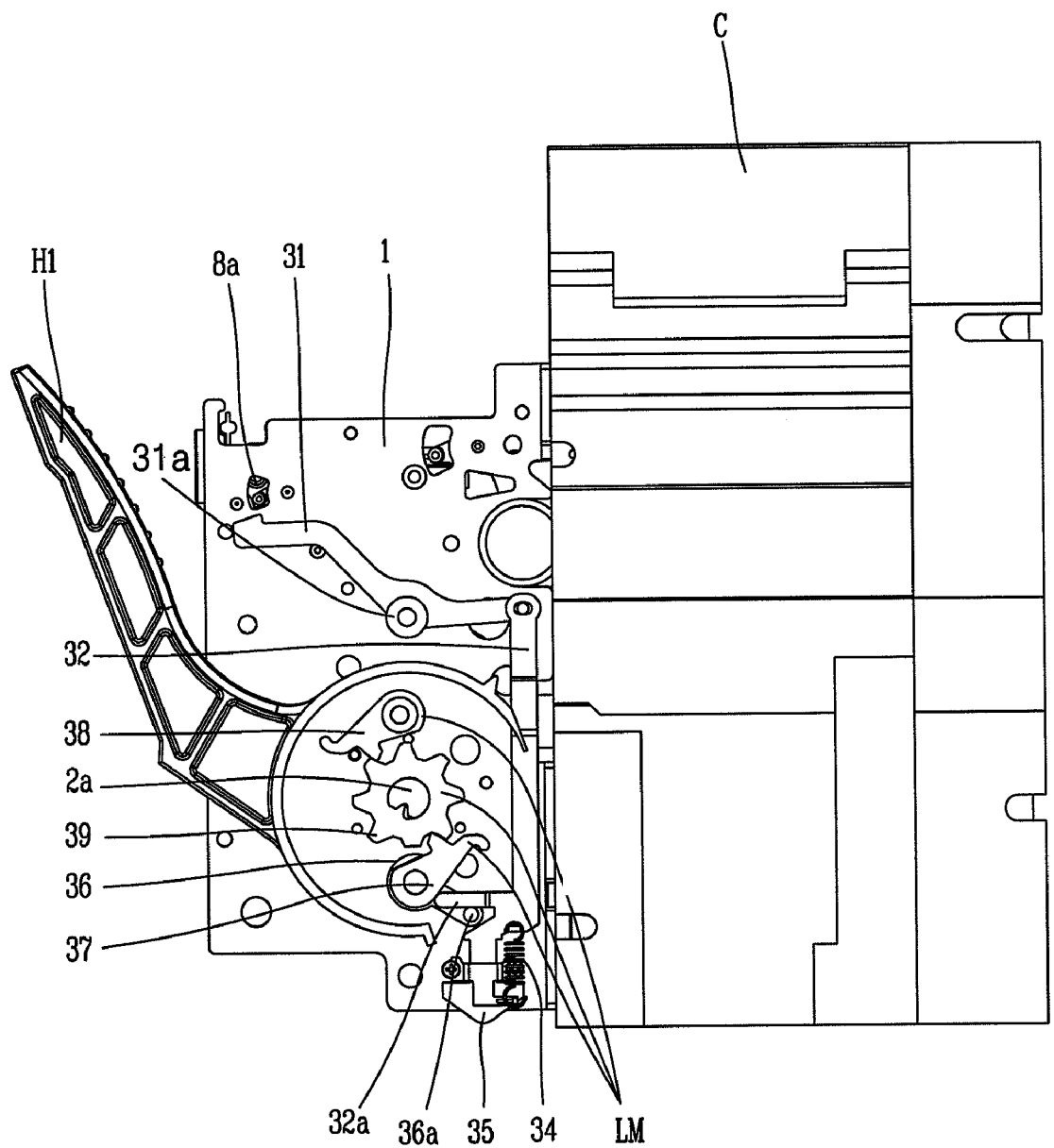
FIG. 9 is a lateral view showing an overall configuration of the air circuit breaker and the automatic discharging apparatus for the closing spring according to the present invention.

The lever 36 is coaxially connected to a rotational shaft of a ratchet 37 (refer to FIG. 9). Accordingly, as the lever 36 is rotated, the ratchet is rotated to a position at which a ratchet wheel 39 (refer to FIG. 9) and the cam shaft 2a (refer to FIG. 9) are allowed to be rotated.

Figure 5:
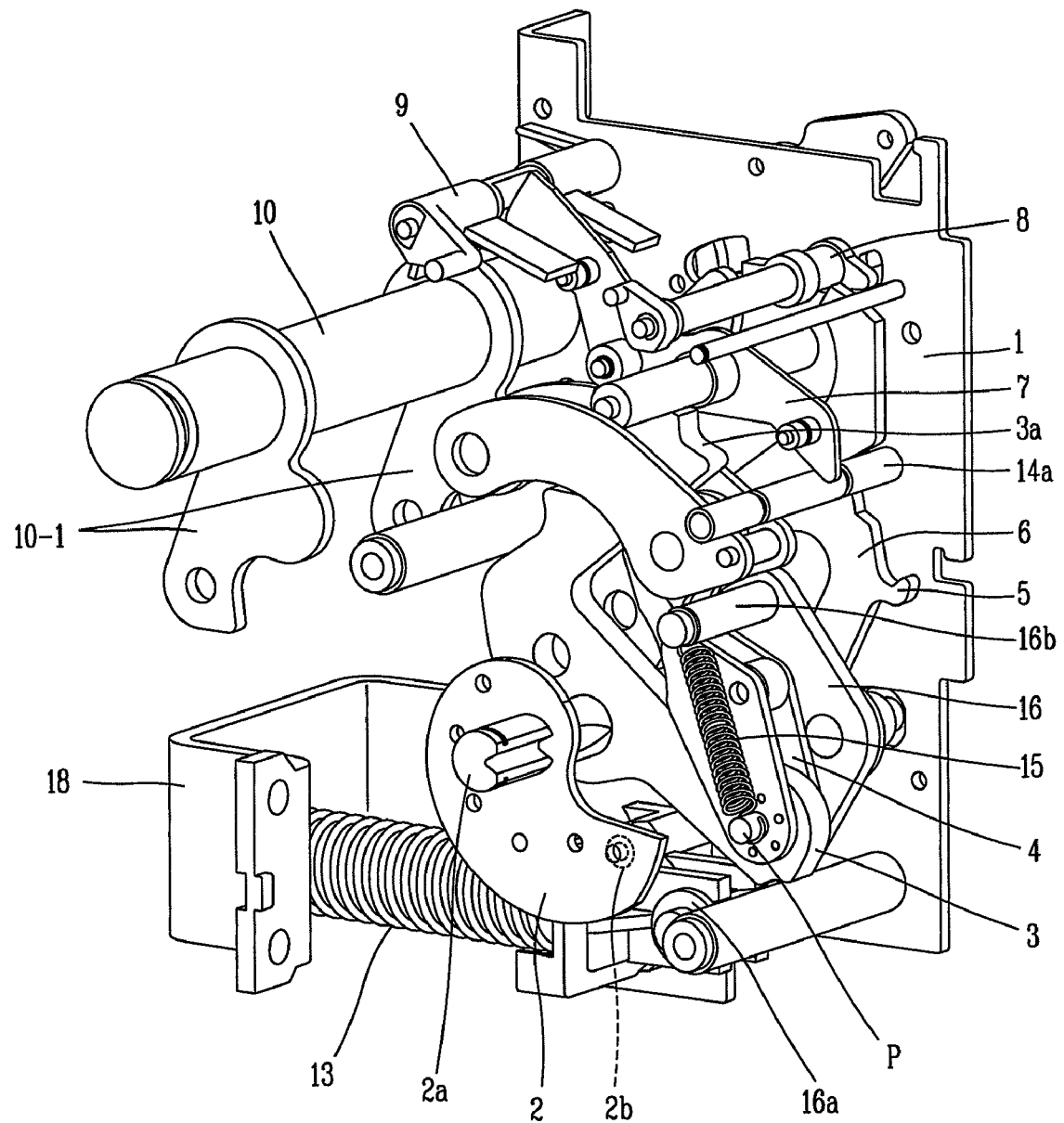

The link mechanism is connected to the lever 36, and allows the ratchet wheel and the cam shaft to be rotatable at the pulled-out position of the main body 20 (refer to FIG. 6). The lever 36 can accordingly be rotated such that the closing spring 13 (refer to FIG. 5) can be discharged.

The spring 34 provides elastic energy which allows the rotation of the lever 36 to the link mechanism at the pulled-out position of the main body 20.

Meanwhile, the air circuit breaker may include a closing latch 5 (refer to FIG. 5) for maintaining the closing spring 13 (refer to FIG. 5) of the switching mechanism SM (refer to FIG. 6) in the charged state, and a unit for releasing the closing latch 5.

The unit for releasing the closing latch 5 may include an on-shaft 8 (refer to FIG. 5) rotatable to a position at which the closing latch 5 is latched or released, and an on-link 8a (refer to FIG. 9) coaxially connected to the on-shaft 8 to allow the on-shaft 8 to be rotated to the position at which the closing latch 5 is released.

The unit 30 for releasing the cam shaft rotation preventing unit is disposed at the position at which it can drive the unit for releasing the closing latch 5 to move the unit for releasing the closing latch 5 to its release position. The unit 30 for releasing the cam shaft rotation preventing unit may include a first link 31, a second link 32, and a lower end movable member 35.

The first link 31 is rotatable centering around a pivot 31a.

The second link 32 is connected to the first link 31, and movable in a vertical direction so as to rotate the first link 31 and the lever 36 at the same time. Also, one end of the spring 34 is supported by the second link 32.

The lower end movable member 35 is elastically supported by a lower end portion of the second link 32, and supports another end of the spring 34. The lower end movable member 35 moves in the vertical direction to provide a vertical driving force both the spring 34 and the second link 32.

An unexplained reference numeral 31b in FIG. 8 denotes a connection pin of the first link 31 and the second link 32.

In FIG. 8, reference number 36a denotes a power receiving protrusion integrally formed with the lever 36 for receiving a driving force by which the lever is 36 is rotatable from the second link 32. Reference numeral 32a denotes a lever rotating portion disposed at a lower portion of the second link 32. The lever rotating portion 32a is disposed to supply a rotation force to the lever 36 by interposing the power receiving protrusion 36a between it and an inclined surface at its lower side.

The lower end movable member 35 is disposed to be vertically movable on a lower end portion of the second link 32, and is provided with a pair of guide members 33 for guiding its vertical movement. The pair of guide members 33 are disposed on the side plate 1 (refer to FIG. 6) of the switching mechanism SM (refer to FIG. 6) to be spaced part from each other with a distance longer by an allowance than the width of the lower end movable member 35.

In detail, the spring 34 has one end supported by a spring support member (no reference numeral given) disposed at the lower end portion of the second link 32, and another end supported by a spring support member (no reference numeral given) disposed at the lower end movable member 35.

An overall configuration of the automatic discharging apparatus for the closing spring in the air circuit breaker will now be described with reference to FIG. 9.

That is, the air circuit breaker according to the present invention may comprise a main body 20, a cradle C for supporting the main body 20 (refer to FIG. 6) to be pushed in and pulled out, a closing spring 13 (refer to FIG. 5) for applying elastic energy to close the air circuit breaker, a switching mechanism having a cam 2 (refer to FIG. 5) for allowing the closing spring to charge elastic energy or discharge the charged elastic energy and a cam shaft 2a for rotatably supporting the cam, a cam shaft rotation preventing unit LM installed on the cam shaft 2a for preventing the rotation of the cam shaft 2a by an elastic restoring force of the closing spring, and a unit for releasing the cam shaft rotation preventing unit (refer to reference numeral 30 in FIG. 8) connected to the cam shaft rotation preventing unit LM and operated according to a position at which the main body is pulled out of the cradle C to release the cam shaft rotation preventing unit (LM).

The cam shaft rotation preventing unit LM may include a ratchet wheel 39 and at least one ratchet 37 and 38.

The ratchet wheel 39 is installed on the cam shaft 2a to be rotatable together with the cam shaft 2a.

The at least one ratchet 37 and 38 may be rotatable to a position at which the rotation of the ratchet wheel 39 and the cam shaft 2a are allowed such that elastic energy of the closing spring can be discharged, and a position at which the rotations of the ratchet wheel 39 and the cam shaft 2a are restricted such that the elastic energy of the closing spring can be charged. Here, the at least one ratchet may include a main ratchet 37 and an auxiliary ratchet 38.

As shown in FIG. 9, the unit for releasing the cam shaft rotation preventing unit may include the lever 36, the link mechanism and the spring 34.

The lever 36 is coaxially connected to a rotational shaft of the main ratchet 37. Accordingly, as the lever 36 is rotated, the main ratchet 37 is rotated to a position at which the ratchet wheel 39 and the cam shaft 2a are allowed to be rotated.

The link mechanism is connected to the lever 36, and rotates the lever 36 to allow the rotation of the ratchet wheel 39 and the cam shaft 2a at the position at which the main body is pulled out, such that the elastic energy of the closing spring can be discharged.

The spring 34 provides elastic energy for rotating the lever 36 to the link mechanism at the position at which the main body is pulled out.

The link mechanism may include a first link 31, a second link 32 and a lower end movable member 35.

The first link 31 is disposed at a position at which the unit for releasing the closing latch 5 (refer to FIG. 5), so as to move the unit for releasing the closing latch to its release position.

The second link 32 is connected to the first link 31 which is rotatable centering around the pivot 31a, and is movable in a vertical direction to allow both the first link 31 and the lever 36 to be rotated at the same time. Also, one end of the spring 34 is supported by the second link 32.

The lower end movable member 35 is elastically supported at the lower end portion of the second link 32, and supports another end of the spring 34. The lower end movable member 35 longitudinally moves to supply a longitudinal driving force to the second link 32 as well as to the spring 34.

The unit for releasing the closing latch may include an on-shaft 8 (refer to FIG. 5) rotatable to the position at which the closing latch is latched or released, and an on-link 8a (refer to FIG. 9) for rotating the on-shaft 8 to the position at which the closing latch is released.

A lower end portion of the lower end movable member 35 may be formed to be pointed so as to be inserted into a gap between a girder G (refer to FIG. 6) and an upper cover T of a transfer device (refer to FIG. 6).

An unexplained reference numeral H1 denotes a closing spring charging handle in FIG. 9.

Hereinafter, operations of the automatic discharging apparatus for the closing spring in the air circuit breaker and the air circuit breaker having the same will be described with reference to FIGS. 10 and 11 and other drawings.

Figure 1A:
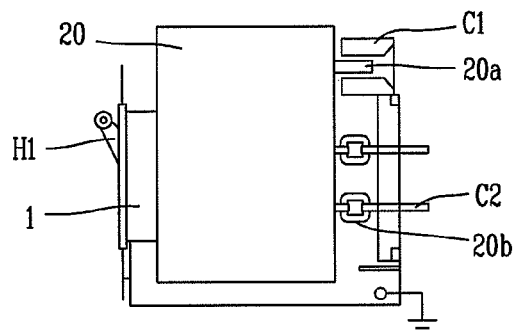
FIGS. 1A to 1D are state views showing an operational state of a general pull-out type air circuit breaker.
Figure 1B:
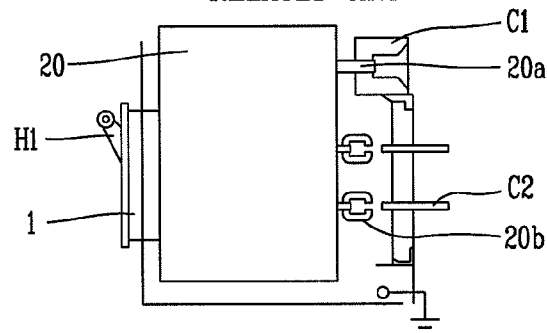
Figure 1C:
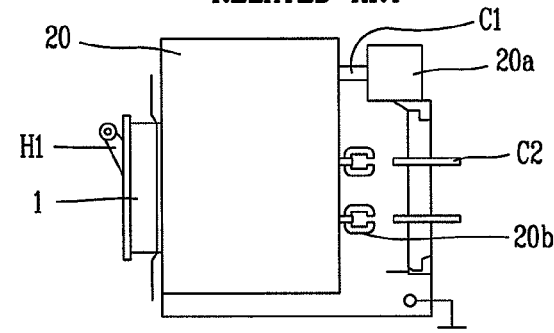
Figure 1D:
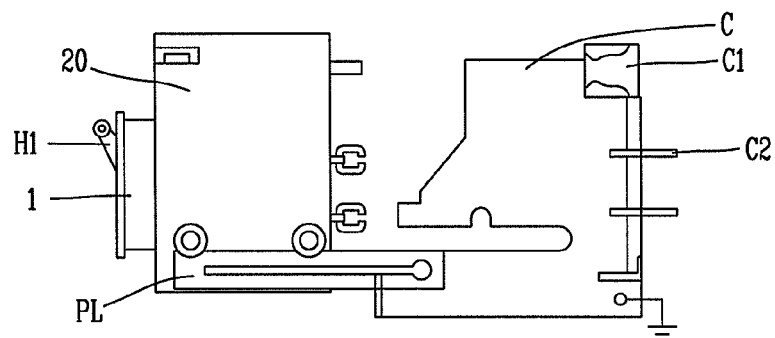
Figure 2:
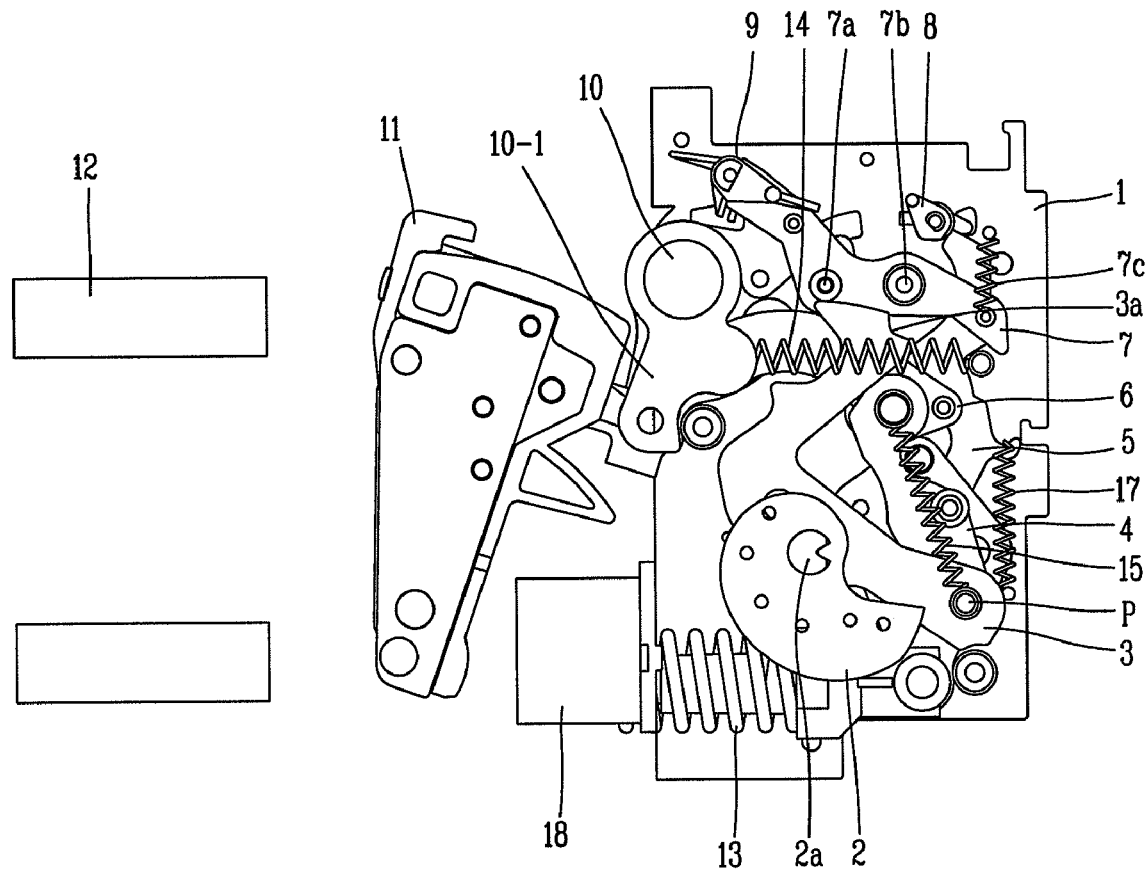
FIGS. 2 to 5 are views showing a relation between a closing spring and a cam shaft in charging and discharging in an air circuit breaker according to the related art.
Figure 3:
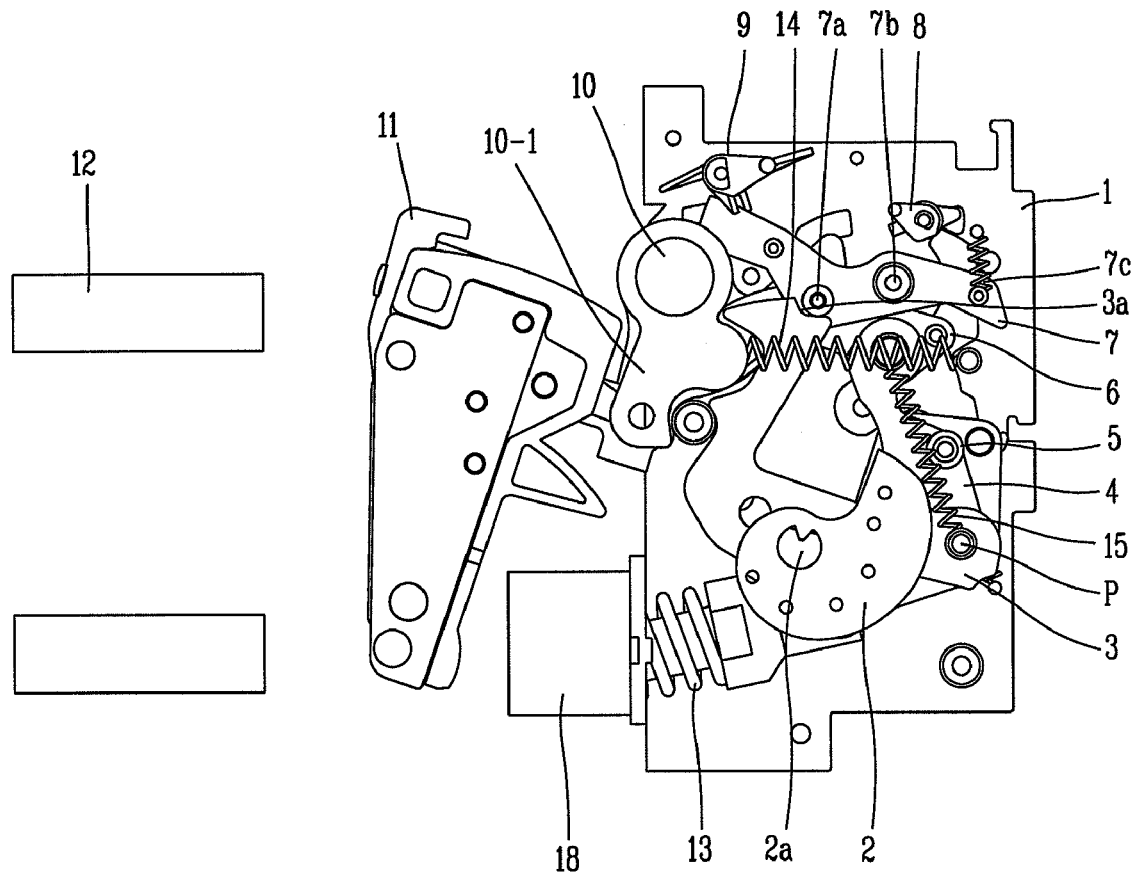

At the connected position, the test position and the disconnected position of the air circuit breaker as shown in FIGS. 1A to 1C, the lower end movable member 35 of the automatic discharging apparatus for the closing spring in the air circuit breaker according to the present invention is contacted by the upper cover T of the transfer device. Accordingly, the spring 34 is compressed and the second and first links 32 and 31 is in a stopped state. In this state, since the first link 31 is not in contact with the on-link 8a which rotates the on-shaft 8, the closing spring 13 (refer to FIG. 8) can be charged by a motor. Also, the lever rotating portion 32a of the second link 32 may not press the power receiving protrusion 36a of the lever 36 to be rotated in a clockwise direction (i.e., a direction to release the main ratchet 37). Accordingly, the closing spring 13 can also manually charge elastic energy by the closing spring charging handle H1.

Figure 7:
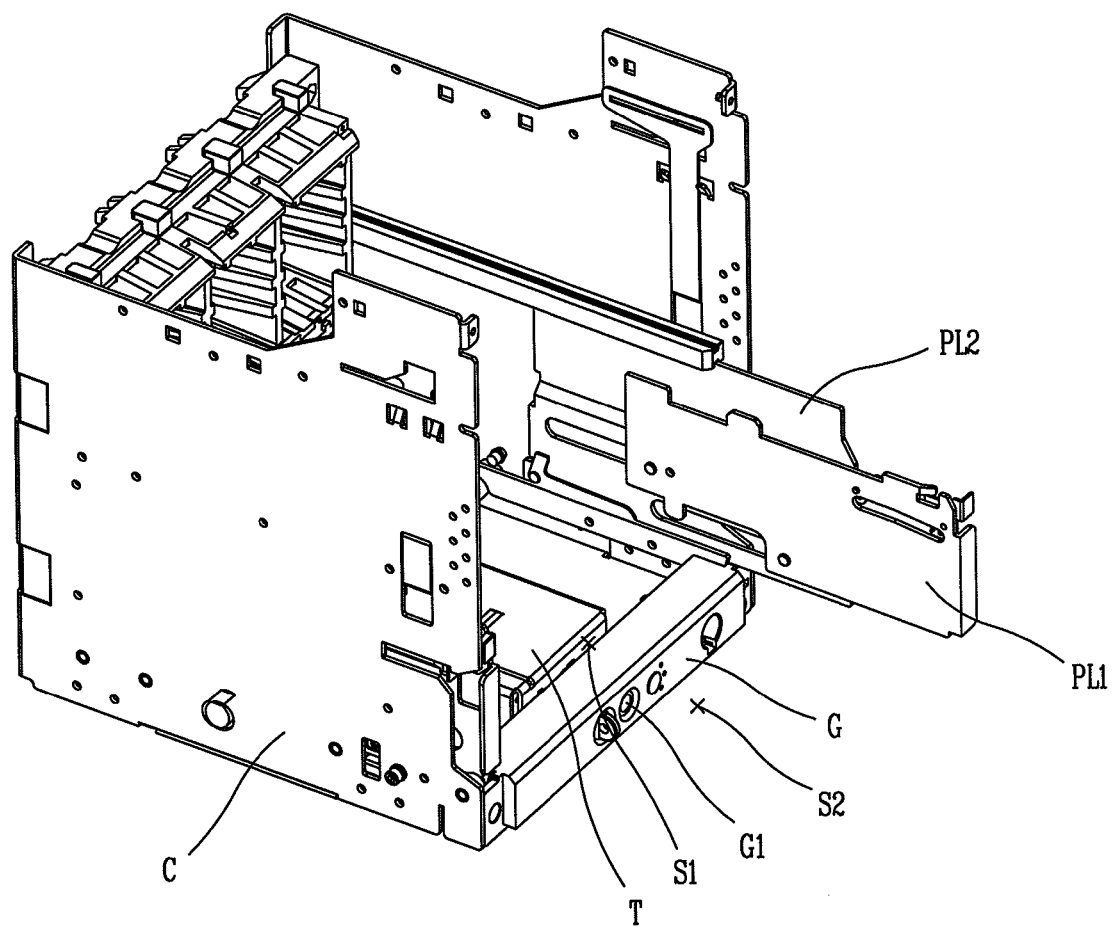
FIG. 7 is a perspective view separately showing a cradle with removing a main body of the air circuit breaker according to the present invention.
Figure 10:
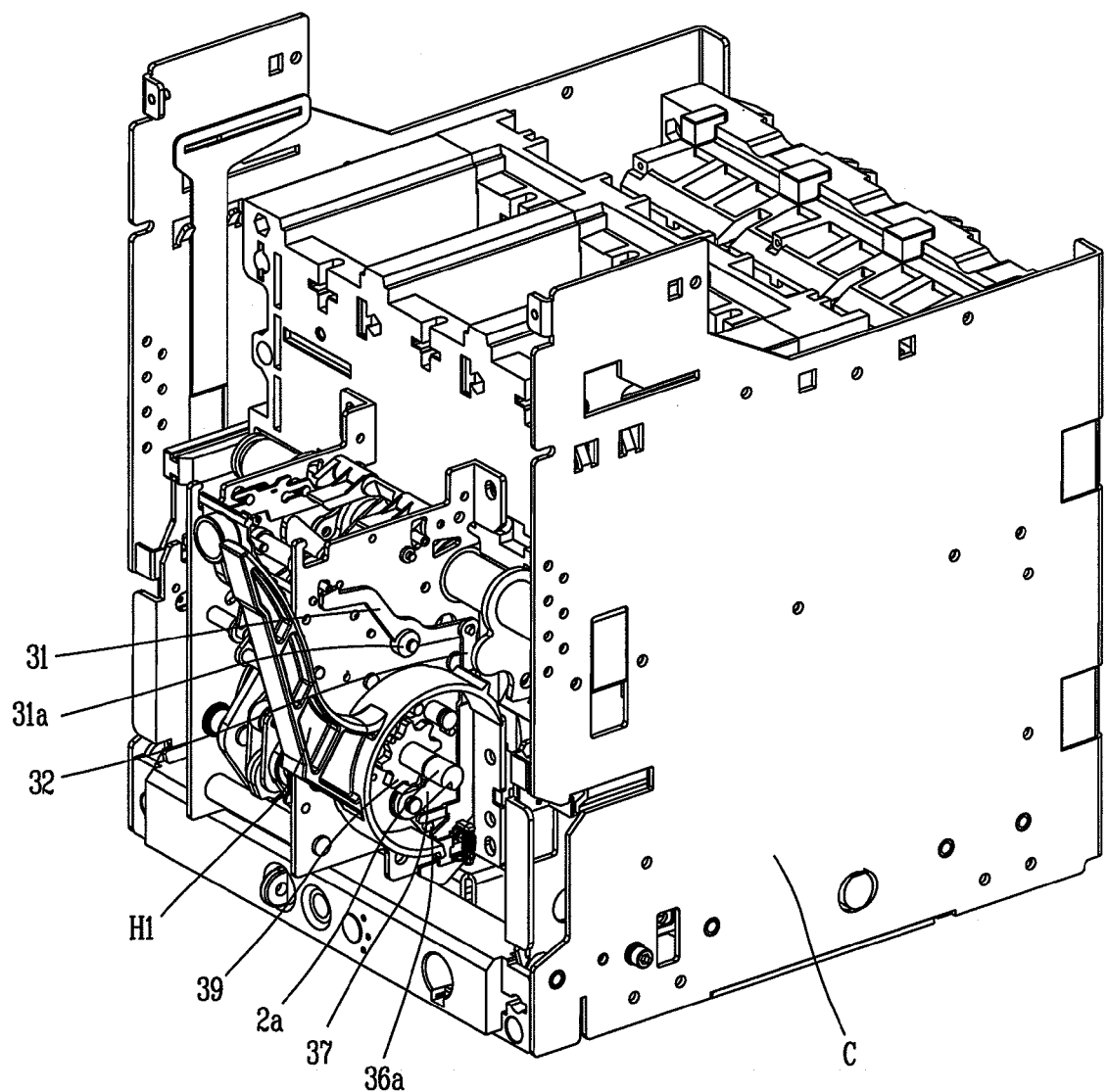
FIG. 10 is a perspective view showing an initial state that the air circuit breaker main body is pulled out of the cradle in the air circuit breaker having the automatic discharging apparatus for the closing spring according to the present invention.

On the other hand, upon further pulling out the main body 20 as shown in FIG. 10 from the disconnected position shown in FIG. 1C, the pointed lower end portion of the lower end movable member 35 is inserted into a gap between the girder G and the transfer device, in more detail, into the gap between the girder G and the end of the upper cover T of the transfer device (refer to FIG. 7). Accordingly, the air circuit breaker and the automatic discharging apparatus for the closing spring in the air circuit breaker may be located at a first position. That is, once they are located at the first position, namely, once the pointed lower end portion of the lower end movable member 35 is inserted into the gap between the girder G and the end of the upper cover T of the transfer device, the second link 32 is moved down as much as the pointed lower end portion being inserted. Accordingly, the first link 31 is rotated clockwise as shown in FIG. 10 to press the on-link 8a which is then rotated thereby. The on-shaft 8 shown in FIG. 5, coaxially rotatably connected to the on-link 8a, is accordingly rotated counterclockwise based on the drawing. Therefore, when the on-shaft 8 is rotated by the on-link 8a, the closing latch 5 is released from the on-shaft 8 to be rotated.

According to the release of the closing latch 5, the cam roller 2b restricted by the closing latch 5 is then released.

Accordingly, the driving lever roller 16a, which is in contact with an outer circumferential surface of the charging cam 2 to thereby prevent the discharging of the closing spring 13, is diverged from the outer circumferential surface of the charging cam 2.

Thus, the closing spring 13 is discharged.

Therefore, in any cases, the main body 20 of the air circuit breaker can be prevented from being pulled out of the cradle in the state that the closing spring is charged.

On the other hand, when the main body 20 of the air circuit breaker is further pulled out from the first position as shown in FIG. 10, the main body of the air circuit breaker is further pulled out with being guided and supported by the first and second pull-out rails PL1 and PL2 as shown in FIG. 7. At the moment that the lower end movable member 35 is located at an empty position S2 in front of the girder G (e.g., referred to as a second position), the lower end movable member 35 is rapidly moved downwardly by an elastic force of the spring 34. Accordingly, the second link 32 to which one end of the spring 34 is connected is also longitudinally moved downwardly, and the lever rotating portion 32a integrally connected to the second link 32 rotates the lever 36 by the power receiving protrusion 36a in the clockwise direction based on FIG. 11. The main ratchet 37, which shares the same rotational shaft with the lever 36, is thereby rotated in the direction to release the ratchet wheel 39 (i.e., the clockwise direction based on FIG. 11). The cam shaft 2a on which the ratchet wheel 39 is axially installed is thusly released to be rotatable. Here, the ratchet wheel 39 is restricted from rotating in the state both the main ratchet 37 and the auxiliary ratchet 38 restricts the rotation at its two positions. However, when the main ratchet 37 is rotated to the position it is released, even if the auxiliary ratchet 38 restricts its rotation, the cam shaft 2a can be rotated by the strong elastic energy discharged by the closing spring. Therefore, the ratchet wheel 39 can be rotated together with the cam shaft 2a.

Figure 4:
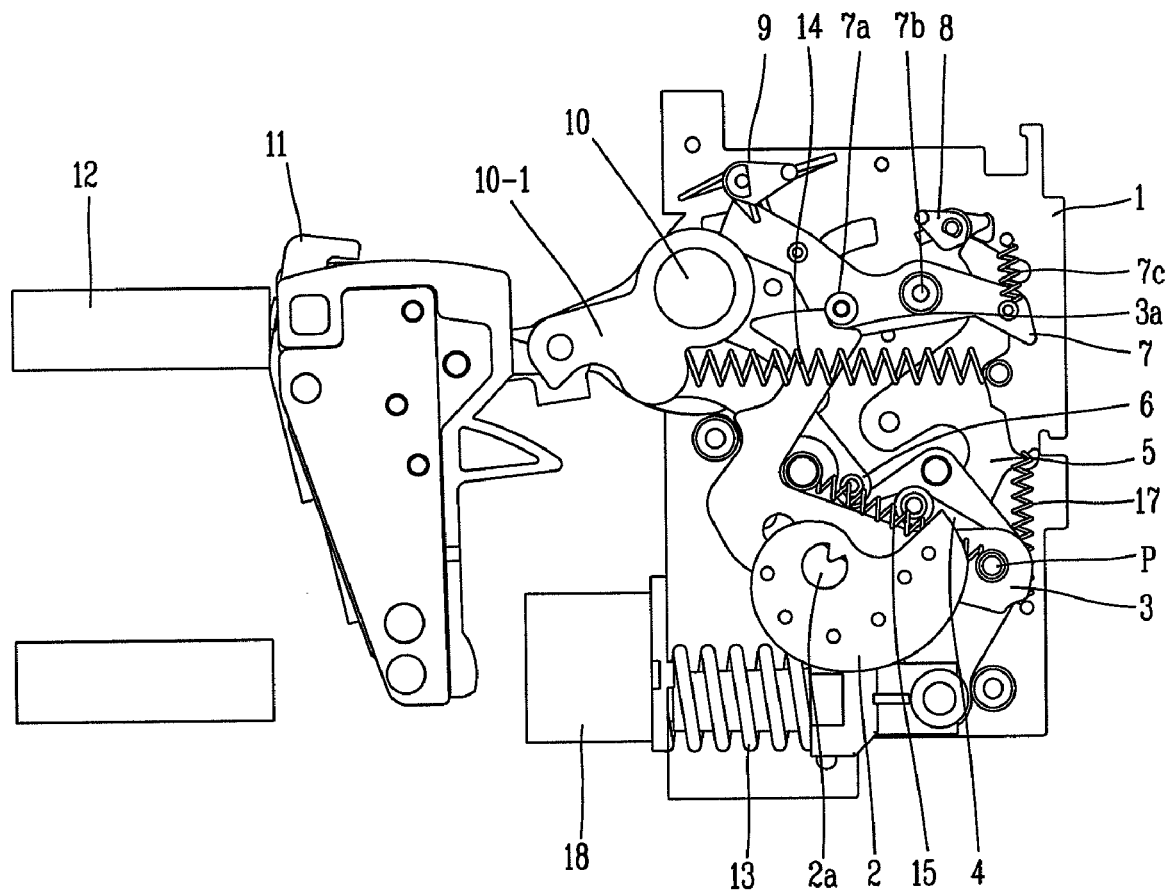
Figure 11:
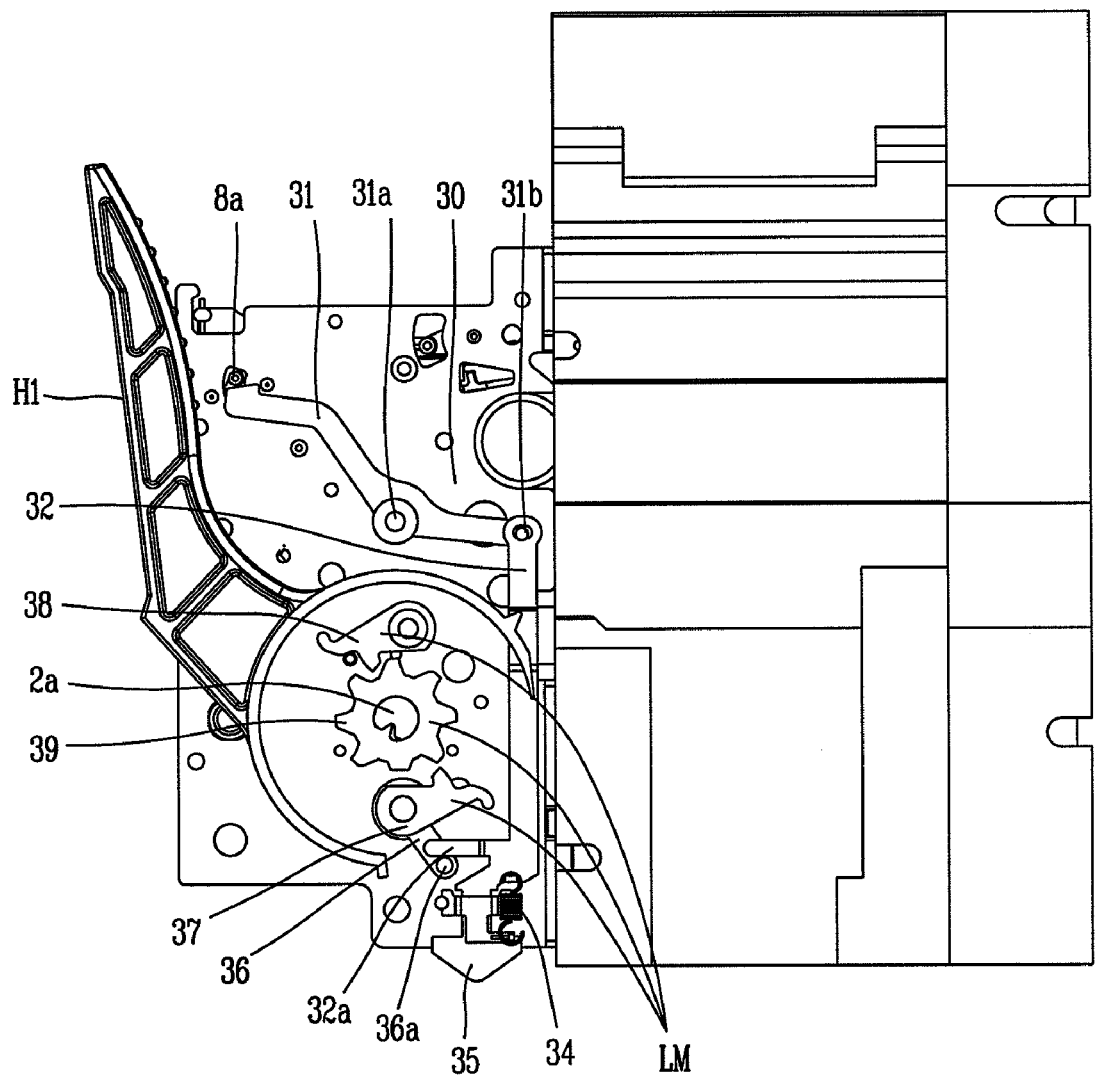
FIG. 11 is a lateral view showing the state that the main body is completely pulled out of the cradle in the air circuit breaker having the automatic discharging apparatus for the closing spring according to the present invention.

As the second link 32 moves downwardly, the first link 31 is rotated in the clockwise direction on FIG. 11 centering around the pivot 31a. According to the clockwise rotation, the first link 31 is in contact with the on-link 8a to make it rotated. Therefore, the on-shaft 8 shown in FIG. 4, coaxially rotatably connected to the on-link 8a, is rotated in the counterclockwise direction on the drawing. When the on-shaft 8 is rotated by the closing latch 5, the closing latch 5 restricted by the on-shaft 8 is released to be rotated.

As the closing latch 5 is released, the cam roller (refer to 2b in FIG. 5) restricted by the closing latch 5 is thusly released.

Accordingly, the driving lever roller 16a, which is in contact with an outer circumferential surface of the charging cam 2 to thereby prevent the discharging of the closing spring 13, is diverged from the outer circumferential surface of the charging cam 2.

Thus, the closing spring 13 is discharged.

That is, even if the closing spring is not discharged at the first position, the closing spring is allowed to be safely discharged at the second position.

In addition, at the second position at which the main body of the air circuit breaker is pulled out of the cradle, the main ratchet 37 releases the ratchet wheel 39, and the first link 31 is in contact with the on-link 8a to thereby release the closing latch 5. Accordingly, it is impossible for a user to charge the closing spring using the closing spring charging handle H1. Therefore, the user such as a repair inspector can be safely protected at the position at which the main body of the air circuit breaker is pulled out.

According to the present invention, elastic energy of the closing spring charged at the time of pulling out the main body can be automatically discharged and the closing spring can be prevented from being charged when the user accidentally operates the closing spring charging handle. Therefore, the user of the air circuit breaker can effectively safely be protected from an accident.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present invention may be embodied in several forms without departing from the characteristics thereof, it should also be understood that the above-described embodiments are not limited by any of the details of the foregoing description, unless otherwise specified, but rather should be construed broadly within the scope as defined in the appended claims, and therefore all changes and modifications that fall within the metes and bounds of the claims, or equivalents of such metes and bounds are therefore intended to be embraced by the appended claims.

What is claimed is:

1. An automatic discharging apparatus for a closing spring in an air circuit breaker comprising a main body, a cradle for supporting the main body to be pushed in or pulled out, and a switching mechanism which includes a closing spring for applying elastic energy to close the air circuit breaker, a cam for allowing the closing spring to charge elastic energy or discharge the charged elastic energy, and a cam shaft for rotatably supporting the cam, the apparatus comprising:
 a cam shaft rotation preventing unit configured to restrict the rotation of the cam shaft by an elastic restoring force of the closing spring,
 the cam shaft rotation preventing unit comprising:
 a ratchet wheel installed on the cam shaft to be rotatable together with the cam shaft, and
 at least one ratchet rotatable to a position at which the ratchet wheel and the cam shaft are allowed to be rotated such that the closing spring discharges elastic energy, or a position at which the ratchet wheel and the cam shaft are restricted from being rotated such that the closing spring charges elastic energy; and a unit for releasing the cam shaft rotation preventing unit connected to the cam shaft rotation preventing unit and configured to allow the cam shaft to be rotated by the elastic restoring force of the closing spring according to positions where the main body is pulled out of the cradle, the unit for releasing the cam shaft rotation preventing unit comprising:

a lever coaxially connected to a rotational shaft of the at least one ratchet and configured to rotate the at least one ratchet according to the rotation thereof to the position at which the ratchet wheel and the cam shaft are allowed to be rotated, a link mechanism being in contact with the lever, and configured to rotate the lever to make elastic energy of the closing spring discharged by allowing the rotations of the ratchet wheel and the cam shaft at a position at which the main body is pulled out, and a spring configured to provide elastic energy for rotating the lever to the link mechanism at the position at which the main body is pulled out.

2. The apparatus of claim 1, wherein the air circuit breaker includes a closing latch for restricting the closing spring of the switching mechanism in a charged state and a unit for releasing the closing latch, wherein the unit for releasing the cam shaft rotation preventing unit comprises:

a first link rotatable centering around a pivot, and located at a position at which the unit for releasing the closing latch is driven so as to allow the unit for releasing the closing latch to be moved to a release position thereof;

a second link connected to the first link, vertically movable to allow the rotations of both the first link and the lever, and supporting one end of the spring; and a lower end movable member elastically supported at a lower end portion of the second link and supporting another end of the spring, and vertically movable to apply a vertical driving force to the second link as well as to the spring.

3. The apparatus of claim 2, further comprising a pair of guide members configured to guide the vertical movement of the lower end movable member.

4. The air circuit breaker of claim 1, wherein the air circuit breaker includes a closing latch for restricting the closing spring in a charged state and a unit for releasing the closing latch, wherein the unit for releasing the cam shaft rotation preventing unit comprises:

a first link rotatable centering around a pivot, and located at a position at which the unit for releasing the closing latch is driven so as to allow the unit for releasing the closing latch to be moved to a release position thereof;

a second link connected to the first link, vertically movable to allow the rotations of both the first link and the lever, and supporting one end of the spring; and a lower end movable member elastically supported by a lower end portion of the second link and supporting another end of the spring, and vertically movable to apply a vertical driving force to the second link as well as the spring.

5. The air circuit breaker of claim 4, wherein the unit for releasing the closing latch comprises:

an on-lever rotatable to a position of restricting or releasing the closing latch; and an on-link coaxially connected to the on-lever and configured to allow the on-lever to be rotated to a position of releasing the closing latch.

6. The air circuit breaker of claim 4, further comprising a pair of guide members configured to guide the vertical movement of the lower end movable member.

7. The air circuit breaker of claim 4, further comprising a transfer device configured to supply a driving force for pulling out the main body, and a girder having a handle connection hole for manually driving the transfer device, wherein a lower end portion of the lower end movable member is pointed so as to be partially inserted into a gap between the girder and the transfer device.

8. An air circuit breaker having an automatic discharging apparatus for a closing spring, comprising:

a main body;

a cradle configured to support the main body to be pushed in or pulled out;

a closing spring configured to provide an elastic energy for closing of the air circuit breaker;

a switching mechanism which includes a cam for allowing the closing spring to charge elastic energy or discharge the charged elastic energy, and a cam shaft for rotatably supporting the cam;

a cam shaft rotation preventing unit configured to prevent the rotation of the cam shaft by an elastic restoring force of the closing spring, the cam shaft rotation preventing unit comprising:

a ratchet wheel installed on the cam shaft to be rotatable together with the cam shaft, and at least one ratchet rotatable to a position at which the ratchet wheel and the cam shaft are allowed to be rotated such that the closing spring discharges elastic energy, or a position at which the ratchet wheel and the cam shaft are restricted from being rotated such that the closing spring charges elastic energy; and a unit for releasing the cam shaft rotation preventing unit connected to the cam shaft rotation preventing unit and configured to allow the cam shaft to be rotated by the elastic restoring force of the closing spring according to positions where the main body is pulled out of the cradle, the unit for releasing the cam shaft rotation preventing unit comprising:

a lever coaxially connected to a rotational shaft of the at least one ratchet and configured to rotate the at least one ratchet to the position at which the ratchet wheel and the cam shaft are allowed to be rotated, a link mechanism being in contact with the lever, and configured to rotate the lever to make elastic energy of the closing spring discharged by allowing the rotation of the ratchet wheel and the cam shaft at a position at which the main body is pulled out, and a spring configured to provide elastic energy for rotating the lever to the link mechanism at the position at which the main body is pulled out.

* * * * *